United States Patent
Tseng

(10) Patent No.: US 6,643,036 B1
(45) Date of Patent: Nov. 4, 2003

(54) INSTALLATION FOR INCREASING USABLE RANGE ALONG AXIAL DIRECTION OF LIGHT SOURCE

(75) Inventor: Jen-Shou Tseng, Miao-Li Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/562,680

(22) Filed: May 2, 2000

(30) Foreign Application Priority Data

Dec. 18, 1999 (TW) ...................................... 88222561 U

(51) Int. Cl.$^7$ ................................................ H04N 1/04
(52) U.S. Cl. ...................... 358/475; 358/483; 358/496; 358/296; 358/474; 358/482; 362/13
(58) Field of Search ................................ 358/474, 475, 358/509, 484, 296, 482, 483, 487, 496; 362/13, 135, 140, 330

(56) References Cited

U.S. PATENT DOCUMENTS 5,300,767 A  *  4/1994  Steinle et al. ............. 250/208.1
6,233,063 B1 *  5/2001  Bernasconi et al. ........ 358/474

\* cited by examiner

Primary Examiner—Edward Coles
Assistant Examiner—Heather D Gibbs
(74) Attorney, Agent, or Firm—J. C. Patents

(57) ABSTRACT

An installation for increasing the usable range along the axial direction of a light source. The installation has a light source and an optical sensor. The light source generates a sense image. The optical sensor further has a sensor and a transparent panel. The sensor is responsible for detecting the image generated by the light source so that a sense image is created. The transparent panel is positioned between the sensor and the light source. A coating on the transparent panel modifies the light transparency along the axial direction of the light source such that light transparency is lower in the middle compared with the ends.

7 Claims, 2 Drawing Sheets

INSTALLATION FOR INCREASING USABLE RANGE ALONG AXIAL DIRECTION OF LIGHT SOURCE

CROSS-REFERENCE TO RELATED APPLICATION

This application claims the priority benefit of Taiwan application serial no. 88222561, filed Dec. 18, 1999.

BACKGROUND OF THE INVENTION

1. Field of Invention

The present invention relates to an installation capable of increasing the usable range of a light source. More particularly, the present invention relates to an installation capable of increasing the usable range along the axial direction of a light source.

2. Description of Related Art

The operating principles of most image-extraction instruments, such as scanners and digital cameras, are very similar. Common features of image-extraction instruments include the use of a light source to produce an optical image and the passing of an optical image through an optical transmission system to an optical sensor. In general, the optical sensor is a charge couple device (CCD).

However, the longitudinal light source of a scanner has one major drawback, namely, brightness level along the central portion of the light axis is usually higher than along the adjacent sides. Hence, an image produced by the light source is brighter in the middle while dimmer along the edges. Since a scanner depends on brightness contrast to operate, a conventional scanner has poorer contrast near the two edges of the light axis. To preserve quality of the scan image, a section near the edge regions is often unused.

Hence, reducing brightness level variation along the axial direction of a light source has become one of the major improvement targets. For example, in Taiwan patent publication no. 244013 entitled 'Improved lamp shade compensation of an optical scanner', brightness variation along the light axis is improved by modifying the lamp shade structure. However, the invention requires specially made components, and hence may lead to an increase in production cost.

In Taiwan patent publication no. 352886 entitled 'A lens structure and its integration with an image-reading device', another method of improving brightness level along the axial direction of a light source is proposed. By changing the degree of reflectivity of a coated film on the reflecting lens inside the scanner, brightness level variation is reduced. However, the reflectivity of more than one reflecting lens needs to be modified, thereby increasing the production cost necessary for achieving the results. In addition, the method is not suitable for other optical sensing devices besides a scanner.

SUMMARY OF THE INVENTION

Accordingly, one object of the present invention is to provide an installation for increasing the scanning range along the axial direction of a light source by changing the light transparency of the transparent panel leading to an optical sensor. In addition, the installation can be applied to other optical devices besides a scanner,such as a digital. camera.

To achieve these and other advantages and in accordance with the purpose of the invention, as embodied and broadly described herein, the invention provides an installation for increasing the scanning range of a light source. The installation includes a light source and an optical sensor. The light source is used as a source for generating the image to be detected. The optical sensor includes a sensor and a transparent panel. The transparent panel is positioned between the sensor and the light source. Furthermore, the transparent panel also has a long axis that runs from edge to edge passing through the panel. The sensor receives an optical image formed by projecting light from the light source through the transparent panel. There is a coating over the transparent panel such that light transparency in the middle section of the long axis is higher than either side.

The coating can be deposited over the entire transparent panel. The coating can be deposited over the imaging section on the transparent panel only. In addition, the coating can be made by forming a plurality of coating materials of the same thickness over surface regions of the transparent panel so that a range of light transparencies are obtained across the panel. Conversely, a coating made from a single material but having a variable thickness is formed across the transparent panel to obtain a range of light transparencies across the panel.

In this invention, a coating is added onto the transparent panel of an optical sensor so that light transparency varies across the panel. Hence, there is no need to produce or modify components. Therefore, this invention is able to improve brightness variation of a light source with only minimum modification of the components. In addition, the installation can be applied to other optical devices besides a scanner, such as a digital camera.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
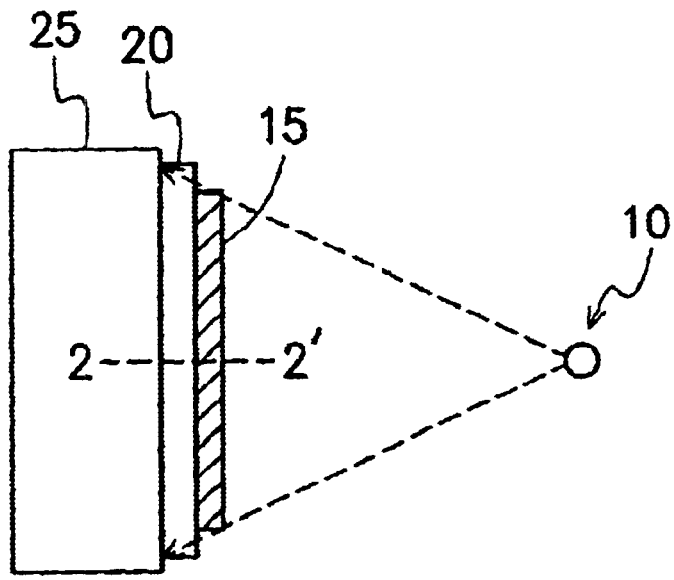
FIG. 1 is a schematic structural diagram of an optical sensor system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic structural diagram of an optical sensor system according to one preferred embodiment of this invention. The system includes. a light source 10, a coating 15, a transparent panel 20 and a sensor 25. The light source 10 is able to generate an image for sensing. The sensor 25, the transparent panel 20 and the coating 15 together constitute the optical sensor. The transparent panel 20 is positioned between the sensor 25 and the light source 10. When the image produced by the light source is projected onto the transparent panel 20, a long axis is created. The coating 15 is formed over one glass surface of the transparent panel 20.

The sensor 25 detects the light image after light from the light source 10 has passed through the coating 15 and the transparent panel 20. The coating 15 on the transparent panel 20 modifies the light transparency along the long axis such that the light transparency is lower in the middle compared with either end.

The coating 15, as shown in FIG. 1, is formed only over the region within the transparent panel 20 where the projected image produced by the light source 10 is covered. In practice, the coating 15 may cover the entire glass surface of the transparent panel 20.

Figure 2A:
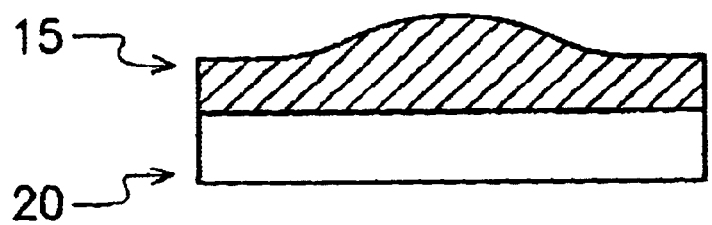
FIG. 2a is a cross-sectional side view of the structure along line 2—2' of FIG. 1 according to a first embodiment of this invention.
Figure 3A:
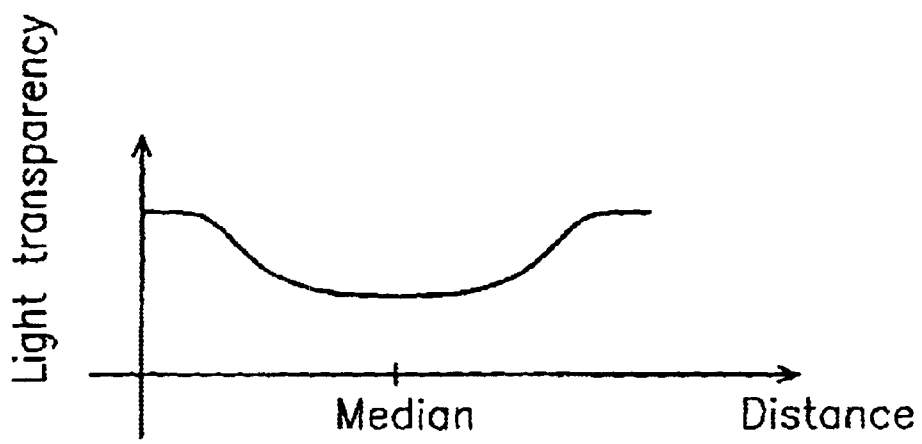
FIG. 3a is a graph showing the variation of light transparency along the long axis of the transparent panel due to the presence of the coating.

FIG. 2a is a cross-sectional side view of the structure along line 2—2' of FIG. 1 according to a first embodiment of this invention. As shown in FIG. 2a, the coating 15 on the transparent panel 20 is formed using a single material having a variable thickness along the long axis. In other words, the thickness of the coating 15 near the middle is greater than the thickness along the two sides. Light transparency of the coating 15 has a characteristic curve shown in FIG. 3a. In fact, FIG. 3a is a graph showing the variation of light transparency along the long axis of the transparent panel due to the presence of the coating.

Figure 3B:
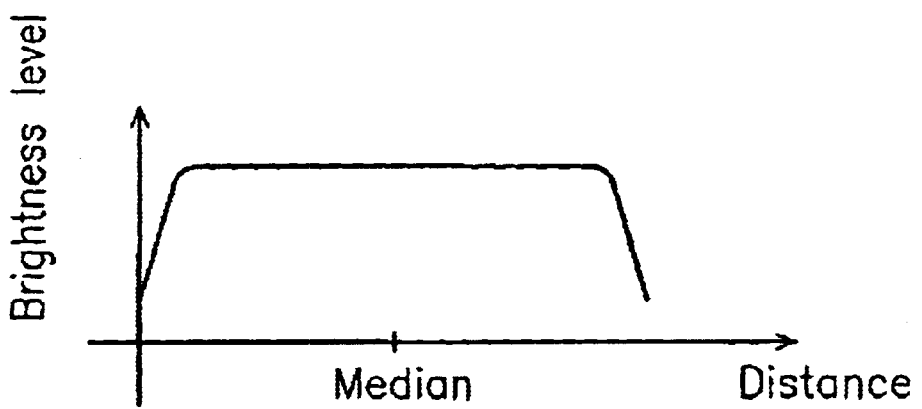
FIG. 3b is a graph showing the variation of brightness level along the light axis of the light source.
Figure 3C:
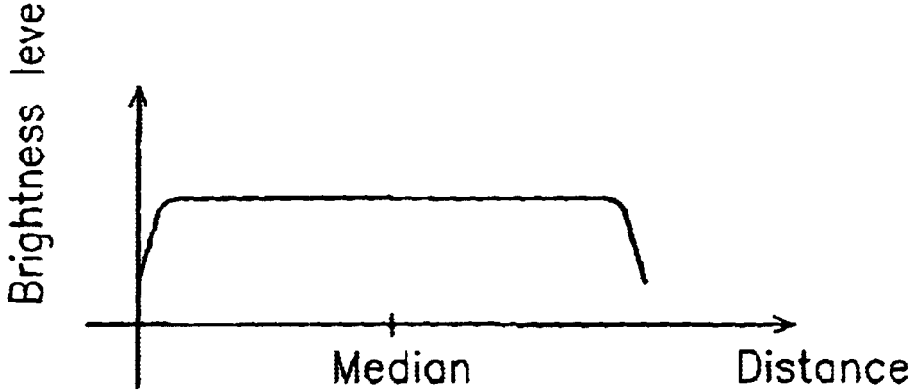
FIG. 3c is a graph showing the variation of brightness level after light from the light source passes through the transparent panel.

FIG. 3b is a graph showing the variation of brightness level along the light axis of the light source. After light from the light source 10 is passed through the transparent panel 20 with a single-layered coating 15, variation of brightness level along the long axis is shown in FIG. 3c. As shown in FIGS. 3b and 3c, brightness level after passing through the transparent panel 20 is much flatter and wider than the brightness level along the light axis of the original light source 10. Since the optical sensor relies heavily on brightness contrast to carry out detection, the brightness curve shown in FIG. 3c is more suitable for image detection than the curve shown in FIG. 3b.

Figure 2B:
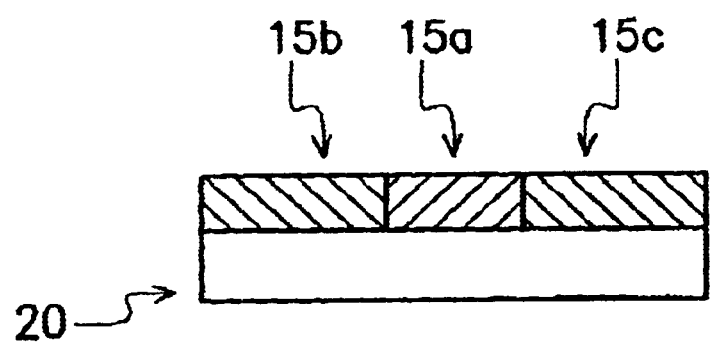
FIG. 2b is a cross-sectional side view of the structure along line 2—2' of FIG. 1 according to a second embodiment of this invention.

FIG. 2b is a cross-sectional side view of the structure along line 2—2' of FIG. 1 according to a second embodiment of this invention. As shown in FIG. 2b, the coating 15 on the transparent panel 20 is actually comprised of three different coatings 15a, 15b and 15c, each having a different light transparency but identical thickness. All the coatings 15a, 15b and 15c together produce a light transparency curve shown in FIG. 3a. In other words, light transparency in the middle is lower relative to the sides.

FIG. 3b is a graph showing the variation of brightness level along the light axis of the light source. After light from the light source 10 is passed through the transparent panel 20 with multiple coatings 15a, 15b and 15c, variation of brightness level along the long axis is shown in FIG. 3c. As shown in FIGS. 3b and 3c, brightness level after passing through the transparent panel 20 is much flatter and wider than the brightness level along the light axis of the original light source 10. Since the optical sensor relies heavily on brightness contrast to carry out detection, the brightness curve shown in FIG. 3c is more suitable for image detection than the curve shown in FIG. 3b.

Note that the number of coatings on the transparent panel 20 is not limited to three. To fit a particular design, the number of coatings can increase and the type of material forming the coatings can vary.

In summary, the greatest benefit of this invention is the reduction of brightness variation of a light source without the need to produce new components. In fact, only minor modifications of a single component are needed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An installation for increasing the usable range along the axial direction of a light source, comprising:
   a light source for generating a sense image; and
   an optical sensor, wherein the optical sensor includes a sensor, a transparent panel and a coating, wherein the transparent panel is positioned between the sensor and the light source, the coating is formed over the transparent panel, the transparent panel has a long axis running from edge to edge, the sensor detects an image after light from the light source has passed through the coating and the transparent panel, and the coating on the transparent panel modifies the light transparency along the long axis such that the light transparency is lower in the middle compared with the ends.

2. The installation of claim 1, wherein the coating is formed only over the image-forming region when light passes through the transparent panel.

3. The installation of claim 1, wherein the coating actually comprises of a plurality of coatings attached side by side with each coating material having a different light transparency.

4. The installation of claim 1, wherein the sensor includes a charge couple device (CCD).

5. The installation of claim 1, wherein one application is the scanner.

6. An installation for increasing the usable range along the axial direction of a light source, comprising:
   a light source for generating a sense image; and
   an optical sensor, wherein the optical sensor includes a sensor, a transparent panel and a coating, wherein the transparent panel is positioned between the sensor and the light source, the coating is formed over the transparent panel, the transparent panel has a long axis running from edge to edge, the sensor detects an image after light from the light source has passed through the coating and the transparent panel, and the coating on the transparent panel modifies the light transparency along the long axis such that the light transparency is lower in the middle compared with the ends,
   wherein the coating comprises of a single coating material but a variable thickness along the long axis.

7. An installation for increasing the usable range along the axial direction of a light source, comprising:
   a light source for generating a sense image; and
   an optical sensor, wherein the optical sensor includes a sensor, a transparent panel and a coating, wherein the transparent panel is positioned between the sensor and the light source, the coating is formed over the transparent panel, the transparent panel has a long axis running from edge to edge, the sensor detects an image after light from the light source has passed through the coating and the transparent panel, and the coating on the transparent panel modifies the light transparency along the long axis such that the light transparency is lower in the middle compared with the ends, wherein the coating comprises of multiple coating materials with different light transparency but with an equal thickness along the long axis.

\* \* \* \* \*